US009203510B2

(12) United States Patent
Zhang et al.

(10) Patent No.: US 9,203,510 B2
(45) Date of Patent: Dec. 1, 2015

(54) METHOD FOR LOCATING FAULT OF SUBMARINE CABLE, REPEATER, AND COMMUNICATION SYSTEM

(75) Inventors: Sen Zhang, Shenzhen (CN); Zhiyong Feng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 924 days.

(21) Appl. No.: 13/427,417

(22) Filed: Mar. 22, 2012

(65) Prior Publication Data

US 2012/0182023 A1 Jul. 19, 2012

Related U.S. Application Data

(63) Continuation of application No. PCT/CN2010/076725, filed on Sep. 8, 2010.

(30) Foreign Application Priority Data

Sep. 22, 2009 (CN) .......................... 2009 1 0173949

(51) Int. Cl.
*G01M 11/00* (2006.01)
*H04B 10/071* (2013.01)

(52) U.S. Cl.
CPC ......... *H04B 10/071* (2013.01); *G01M 11/3109* (2013.01); *G01M 11/3145* (2013.01)

(58) Field of Classification Search
CPC ..................... G01M 11/3145; G01M 11/3109; H04B 10/071
See application file for complete search history.

(56) References Cited

U.S. PATENT DOCUMENTS

| | | | |
|---|---|---|---|
| 5,307,140 A * | 4/1994 | Lewis | 356/73.1 |
| 5,528,404 A | 6/1996 | MacKichan | |
| 5,943,123 A * | 8/1999 | Oshimi et al. | 356/73.1 |
| 6,381,011 B1 * | 4/2002 | Nickelsberg et al. | 356/73.1 |
| 6,807,370 B2 * | 10/2004 | Harasawa | 398/13 |
| 7,326,916 B2 * | 2/2008 | Sugiyama et al. | 250/227.14 |
| 2002/0131099 A1 | 9/2002 | Harasawa | |

(Continued)

FOREIGN PATENT DOCUMENTS

| | | |
|---|---|---|
| CN | 1882862 A | 12/2006 |
| CN | 101114004 A | 1/2008 |
| EP | 1241805 A2 | 9/2002 |

(Continued)

OTHER PUBLICATIONS

Written Opinion of the International Searching Authority dated Dec. 16, 2010 in connection with International Patent Application No. PCT/CN2010/076725.

(Continued)

*Primary Examiner* — Jeff Natalini

(57) ABSTRACT

A method for locating a fault of a submarine cable, a device, and a communication system are provided. A light pulse output by a Repeater (RPT) is incident to a location of a fault as a probe light pulse. The RPT obtains a time difference between the probe light pulse and the reflected probe light pulse, and sends the time difference to a terrestrial Submarine Line Terminal Equipment (SLTE) so that the SLTE may easily locate the fault according to principles of an Optical Time Domain Reflector (OTDR). Compared with the prior art, the method may locate the fault of the submarine cable more quickly and accurately, so that maintainers may maintain the submarine cable in time.

4 Claims, 9 Drawing Sheets

(56) References Cited

U.S. PATENT DOCUMENTS

2005/0084207 A1    4/2005    Nagel et al.
2006/0216038 A1    9/2006    Yokota et al.

FOREIGN PATENT DOCUMENTS

| JP | 04326218 A | 11/1992 |
| JP | 2002005784 A | 1/2002 |
| JP | 2002280978 A | 9/2002 |
| JP | 2003258739 A | 9/2003 |
| JP | 2004279557 A | 10/2004 |
| JP | 2006270270 A | 10/2006 |
| JP | 2007515801 A | 6/2007 |
| JP | 2007205967 A | 8/2007 |
| WO | WO 2005/064826 A1 | 7/2005 |

OTHER PUBLICATIONS

International Search Report dated Dec. 16, 2010 in connection with International Patent Application No. PCT/CN2010/076725.
Partial translation of Office Action dated Feb. 5, 2013 in connection with Chinese Patent Application No. 200910173949.0.
Patent Examination Report No. 1 dated Jun. 27, 2013 in connection with Australian Patent Application No. 2010297750.
Extended European Search Report of the European Searching Authority dated Sep. 14, 2012 in connection with European Patent Application No. 10818381.5, 6 pages.
Notice of Reasons for Rejection dated Jul. 2, 2013 in connection with Japanese Patent Application No. 2012-530116.

\* cited by examiner

METHOD FOR LOCATING FAULT OF SUBMARINE CABLE, REPEATER, AND COMMUNICATION SYSTEM

CROSS-REFERENCE TO RELATED APPLICATIONS

This application is a continuation of International Application No. PCT/CN2010/076725, filed on Sep. 8, 2010, which claims priority to Chinese Patent Application No. 200910173949.0, filed on Sep. 22, 2009, both of which are hereby incorporated by reference in their entireties.

TECHNICAL FIELD

The present invention relates to the field of communications technologies, and in particular, to a method for locating a fault of a submarine cable, a Repeater (RPT), and a communication system.

BACKGROUND

In recent years, Dense Wavelength-Division Multiplexing (DWDM) and Erbium-Doped Optical Fiber Amplifier (EDFA) have become mature technologies, the large-capacity long-distance communication systems including fibers and EDFAs are increasing, and international submarine communication systems are increasing. Therefore, faults of submarine lines should be located quickly and accurately, so that maintainers may remove the faults quickly, which can reduce operation expenditure of the submarine communication system.

Generally, a submarine system includes two Submarine Line Terminal Equipment (SLTEs) and multiple RPTs. Each RPT is configured to amplify an optical signal which is previously attenuated in a link. In the RPT, the EDFAs of each pair of fibers share a pump laser, as shown in FIG. 1. In the prior art, a Coherent Optical Time Domain Reflector (COTDR) technology is most widely used to locate faults of submarine links. Similar to the principles of an existing Optical Time Domain Reflector (OTDR), the COTDR uses Rayleigh scattering and Fresnel reflection to represent fiber characteristics, but the COTDR differs from the principles of the OTDR in that the COTDR uses coherent detection on a receiver to improve the signal-to-noise ratio of a received signal.

FIG. 2 is a schematic brief diagram of hardware which uses a COTDR technology to locate faults of submarine cables. A controller in a terrestrial detection device controls a probe light source to output probe light. The probe light is divided by a 3 dB coupler into two parts. One part is local oscillation light for coherent detection, and the other part is shifted and modulated by an acoustooptic modulator into pulse light. The pulse light and a service signal (namely, main signal in FIG. 2) are coupled together by a wavelength division multiplexer into the fiber as the probe light. The probe light is reflected back to an input side once the probe light pulse runs across fiber joints, break points, break planes, endpoints or other defective points of the fiber, and the reflected light is captured by a probe on the input side. Besides, non-uniform particles smaller than the wavelength in the fiber material lead to Rayleigh scattering. A minor part of the scattered light is transmitted inversely to the input side along the fiber, but the light cannot be reflected or scattered back along the original route. Therefore, a 10 dB beam splitter is added after every EDFA in the RPT (the RPT is the same as the RPT in FIG. 1), so that the light may be reflected and scattered back along a reverse path of the fiber. A wavelength division multiplexer in the terrestrial detection device separates the reflected light and the scattered light from the main signal. The reflected light and the scattered light are filtered by an optical filter, and are incident together with the local oscillation light onto the surface of the probe by a coupler. On the surface of the probe, the light is received coherently. The probe converts the optical signal into an electric signal. The controller processes the electric signal to obtain a loss characteristic curve of the fiber. The loss characteristic curve of the fiber is displayed in a monitor.

When both the transmission line and the EDFA are normal, because the backward scattered light of the probe light is amplified by the EDFA persistently, the backward scattered light received by the COTDR is a series of sawtooth waves. As shown in FIG. 3, the peak value of each sawtooth represents signal strength output by each EDFA after the backward scattered light passes through the EDFA, and the hypotenuse of the sawtooth means that the backward scattered optical power attenuates with the increase of the transmission distance. If the link is cut, because the Fresnel reflected light is much stronger than the Rayleigh scattered light, the strength of the optical signals which are on the curve and detected by the COTDR attenuates quickly. For example, location A in the figure is a fiber cut.

The backward scattered light performs Amplifier Spontaneous Emission (ASE) whenever it passes through an EDFA, and may pass through multiple EDFAs when it arrives at the probe. Therefore, much ASE noise is accumulated along the link. To obtain the accurate location of the fiber cut detected through the curve in FIG. 3, the probe light needs to emit many light pulses, and many averaging operations need to be performed on the receiver to improve the signal-to-noise ratio of the signals. For example, if a single span of a 12000 km submarine link is 100 km, the link requires 120 EDFAs, and the number of amplifiers and the accumulated ASE noise spectrum density are calculated through the following formula (1):

$$D_{ASE}N=\cdot[2\cdot n_{sp}\cdot(G-1)\cdot h\cdot v] \qquad (1)$$

In the foregoing formula, $D_{ASE}$ is the spectrum density of the accumulated ASE noise, N is the number of EDFAs, $n_{sp}$ is the spontaneous emission factor of the EDFA, G is the gain of the EDFA, h is a Planck constant, and v is an optical central frequency. According to general EDFA parameters, the accumulated noise of the 12000 km link may be calculated. In order to detect the 12000 km link by using the COTDR, at least $2^{16}$ averaging operations need to be performed. One averaging operation requires the pulse to finish a round trip of 12000 km. According to the propagation speed of light in the fiber, the time consumed by the $2^{16}$ averaging operations may be calculated, which is not less than 2 hours.

In the process of developing and practicing the prior art, the inventor of the present invention finds that in the method for locating a fault of a submarine cable system in the prior art, the probe light needs to passes through multiple EDFAs when traveling back to the COTDR, and ASE noise is accumulated; consequently, multiple averaging operations need to be performed; in each averaging operation, the probe light pulse travels from the point of emitting the probe pulse to the point of the fiber cut, and then travels back from the point of the fiber cut to the point of emitting the probe pulse. Therefore, it takes too much time to locate the fault of the submarine line in the prior art, and the fault cannot be located in time.

SUMMARY

Embodiments of the present invention provide a method for locating a fault of a submarine cable, a device and a communication system, which can locate the fault of the submarine cable quickly, so that maintainers can maintain the submarine cable in time.

An embodiment of the present invention provides a method for locating a fault of a submarine cable, where the method includes:

receiving, by an RPT on a span to which a location of a fault belongs, an executing location detection command sent by an SLTE;

triggering generation of a probe light pulse according to the received executing location detection command;

transmitting the probe light pulse to the location of the fault along a sending direction of the SLTE;

recording start time T1 and end time T2 of outputting the probe light pulse;

detecting the probe light pulse reflected from the location of the fault, and obtaining time T3 of detecting the probe light pulse; and sending the time T1 and the time T3 to the SLTE, or sending a time difference between the time T3 and the time T1 to the SLTE, where the SLTE obtains the location of the fault according to a formula d=(c*t)/(2IOR), where d represents a distance between a location of generating the probe light pulse and the location of the fault, c represents a propagation speed of light in vacuum, t=T3−T1, and Index Of Refraction (IOR) refers to a refractive index of transmission media.

An embodiment of the present invention also provides an RPT, including a detecting unit and a sending unit; where the detecting unit is configured to receive an executing location detection command sent by an SLTE; trigger generation of a probe light pulse according to the received executing location detection command; transmit the probe light pulse to a location of a fault along a sending direction of the SLTE; record start time T1 and end time T2 of outputting the probe light pulse; detect the probe light pulse reflected from the location of the fault; and obtain time T3 of detecting the probe light pulse; and the sending unit is configured to send the time T1 and the time T3 to the SLTE, or send a time difference between the time T3 and the time T1 to the SLTE, where the SLTE obtains the location of the fault according to a formula d=(c*t)/(2IOR), where d represents a distance between a location of generating the probe light pulse and the location of the fault, c represents a propagation speed of light in vacuum, t=T3−T1, and IOR refers to a refractive index of transmission media.

An embodiment of the present invention also provides a communication system, including an SLTE and an RPT; where the SLTE is configured to obtain a span to which a location of a fault belongs, and send an executing location detection command to an RPT on the span; receive time T1 and time T3 that are sent by the RPT, or receive a time difference which is between the time T3 and the time T1 and sent by the RPT; obtain the location of the fault according to a formula d=(c*t)/(2IOR) and the time T1 and the time T3 or the time difference between the time T3 and the time T1, where d represents a distance between a location of generating a probe light pulse and the location of the fault, c represents a propagation speed of light in vacuum, t=T3−T1, and IOR refers to a refractive index of transmission media; and the RPT is configured to receive the executing location detection command sent by the SLTE; trigger generation of the probe light pulse according to the received executing location detection command; transmit the probe light pulse to the location of the fault along a sending direction of the SLTE; record the time T1 of outputting the probe light pulse; detect the probe light pulse reflected from the location of the fault; obtain the time T3 of detecting the probe light pulse; and send the time T1 and the time T3 to the SLTE or send the time difference between the time T3 and the time T1 to the SLTE.

In the embodiments of the present invention, the RPT controls the internal EDFA, so that the EDFA outputs a light pulse as a probe light pulse which is incident to the location of the fault; therefore, the RPT obtains the time difference between the probe light pulse and the reflected probe light pulse, and sends the time difference to the terrestrial SLTE; and the SLTE may find the location of the fault according to principles of the OTDR. Compared with the prior art, the method may locate the fault of the submarine cable more quickly and accurately, so that the maintainers may maintain the submarine cable in time.

BRIEF DESCRIPTION OF THE DRAWINGS

To make the technical solutions in the embodiments of the present invention or in the prior art clearer, the following outlines accompanying drawings involved in the description of the embodiments or the prior art. Apparently, the accompanying drawings outlined below are merely part of the embodiment of the present invention. Persons of ordinary skill in the art may also derive other drawings from the accompanying drawings without creative efforts.

DETAILED DESCRIPTION OF THE EMBODIMENTS

The following detailed description is given in conjunction with the accompanying drawings to provide a clear and thorough understanding of the present invention. Evidently, the described embodiments are merely part of rather than all of the embodiments of the present invention. All other embodiments, which may be derived by those of ordinary skill in the art from the embodiments of the present invention without creative efforts, shall fall within the protection scope of the present invention.

Embodiment 1

Figure 1:
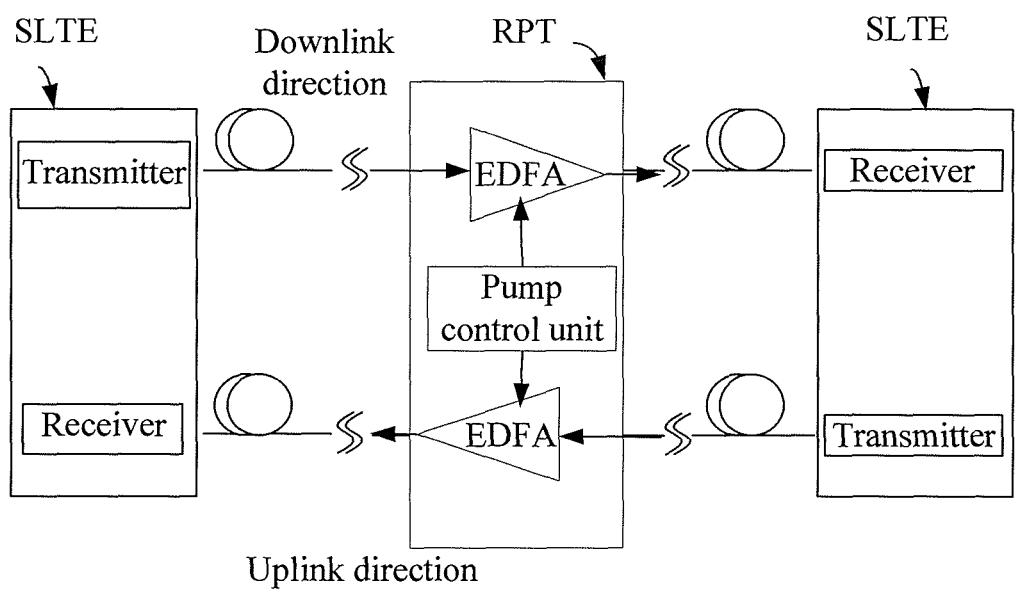
FIG. 1 is a structure diagram of a submarine cable system in the prior art.
Figure 2:
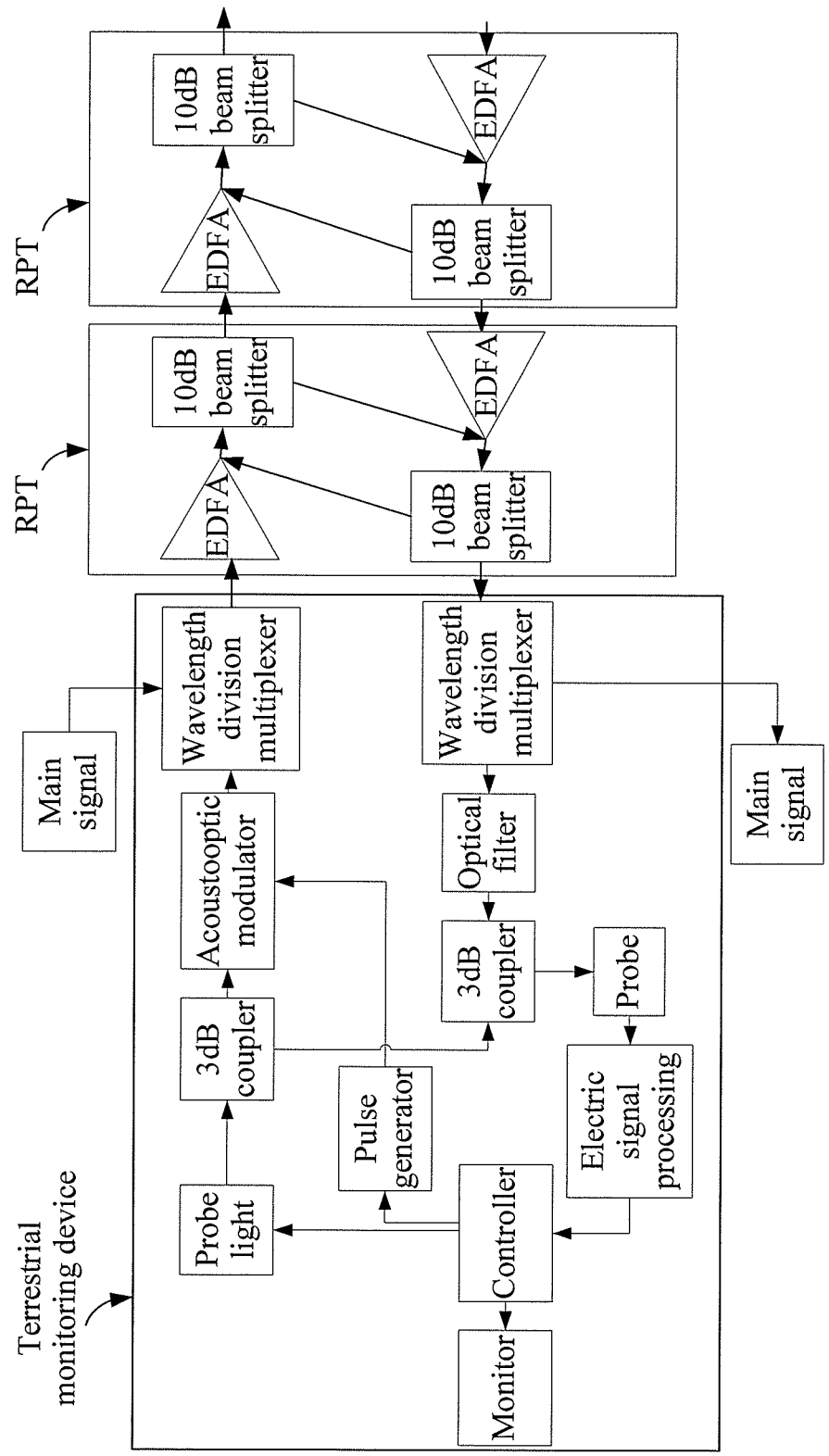
FIG. 2 is a schematic diagram of a system for locating a fault of a submarine cable by using principles of a COTDR in the prior art.
Figure 3:
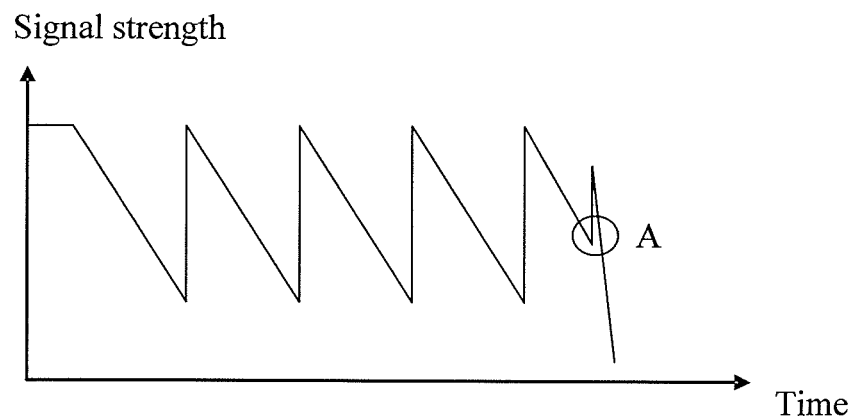
FIG. 3 is a schematic diagram of a probe result curve by using principles of a COTDR in the prior art.
Figure 4:
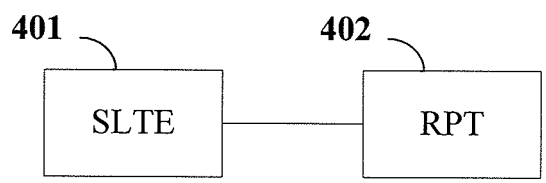
FIG. 4 is a schematic diagram of a communication system according to Embodiment 1 of the present invention.

An embodiment of the present invention provides a communication system. As shown in FIG. 4, the communication system includes an SLTE 401 and an RPT 402.

The SLTE 401 is configured to obtain a span to which a location of a fault belongs and send an executing location detection command to the RPT 402 on the span; receive time T1 and time T3 that are sent by the RPT 402, or receive a time difference which is between the time T3 and the time T1 and sent by the RPT 402; obtain the location of the fault according to a formula $d=(c*t)/(2IOR)$ and the time T1 and the time T3 or the time difference between the time T3 and the time T1, where d represents a distance between a location of generating a probe light pulse and the location of the fault, c represents a propagation speed of light in vacuum, $t=T3-T1$, and IOR refers to a refractive index of transmission media.

It should be noted that the SLTE 401 may obtain the span to which the location of the fault belongs in the following way: sending a query command to the RPT 402, receiving a response command sent by the RPT 402, and determining, according to an input light power and an output light power which are of the RPT 402 and included in the response command, the span to which the location of the fault belongs.

The SLTE 401 may also obtain the span to which the location of the fault belongs according to the prior art. For example, because the RPT in this communication system is submarine and is not suitable for communicating with the SLTE 401 directly. In order to query and control the state of submarine devices, an intelligent submarine cable monitoring device (the intelligent submarine cable monitoring device may be integrated in the SLTE 401, or may be a stand-alone device independent of the SLTE 401; in this embodiment, the intelligent submarine cable monitoring device is integrated in the SLTE 401 for ease of understanding) controls the SLTE 401 to send a query command, and the query command is transmitted to each submarine device through an optical path or a feeder system. After receiving the query command, the submarine devices execute the corresponding query or control operations according to the query command corresponding to their respective address codes, and then send a response command that carries the result of the query or control to the SLTE 401 through the optical path or feeder system. The intelligent submarine cable monitoring device may locate the span in which the fault of the submarine device is located quickly by querying the input light power and the output light power of each RPT. However, the distance between spans is usually scores of kilometers or even over a hundred kilometers. Therefore, the intelligent submarine cable monitoring device can know the span in which the fault is located, and may know an identifier of the RPT 402 which is the closest to the location of the fault on this span and may communicate with the SLTE 401. Therefore, the SLTE 401 may notify the RPT 402 which is the closest to the location of the fault and may communicate with the SLTE 401 to perform location detection.

The RPT 402 is configured to receive the executing location detection command sent by the SLTE 401; trigger the generation of the probe light pulse according to the received executing location detection command; transmit the probe light pulse to the location of the fault along a sending direction of the SLTE 401; record the time T1 of outputting the probe light pulse; detect the probe light pulse reflected from the location of the fault; and obtain the time T3 of detecting the probe light pulse; and send the time T1 and the time T3 to the SLTE 401 or send the time difference between the time T3 and the time T1 to the SLTE 401.

It should be noted that the RPT 402 may trigger the generation of the probe light pulse according to the executing location detection command received from the SLTE 401, and perform location detection. The RPT 402 may obtain the distance between the RPT 402 and the fault according to the formula $d=(c*t)/(2IOR)$ from the time spent in transmitting the probe light pulse and the transmission rate of light in the transmission media. Because the location of the RPT 402 relative to the SLTE 401 is known, the location of the fault may be easily located. For detailed description about the RPT 402, reference may be made to an RPT described in the following Embodiment 2, Embodiment 3, and Embodiment 4.

In the communication system provided in the embodiment of the present invention, the communication system first locates the span in which the fault is located, and controls, according to an RPT 402 in the span, an internal component to output a light pulse, which is incident to the location of the fault as a probe light pulse. The RPT 402 obtains the time difference between the probe light pulse and the reflected light pulse, and sends the time difference to the terrestrial SLTE 401. In this way, the SLTE 401 may easily locate the fault according to the principles of the OTDR. Compared with the prior art, the method may locate faults of the submarine cables more quickly and accurately, so that maintainers may maintain the submarine cable in time.

Embodiment 2

Figure 5:
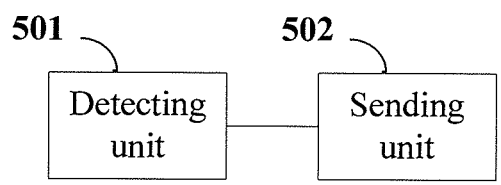
FIG. 5 is a schematic diagram of logical units of an RPT according to Embodiment 2 of the present invention.

An embodiment of the present invention provides an RPT. As shown in FIG. 5, the RPT includes a detecting unit 501 and a sending unit 502.

The detecting unit 501 is configured to receive an executing location detection command sent by an SLTE; trigger generation of a probe light pulse according to the received executing location detection command; transmit the probe light pulse to a location of a fault along a sending direction of the SLTE; record start time T1 and end time T2 of outputting the probe light pulse; detect the probe light pulse reflected from the location of the fault; and obtain time T3 of detecting the probe light pulse.

The detailed solution of the detecting unit 501 in the RPT being configured to receive the executing location detection command sent by the SLTE may be implemented through joint work of a pump laser, an EDFA, and a controller. The pump laser is connected with the EDFA and controlled by the controller, and the pump laser emits laser light to the EDFA. Therefore, the RPT may amplify the received optical signal, and the optical signal (information carried in the optical signal may be the executing location detection command) may be received. This part of solution may be the same as that of the prior art. For more details, see the prior art.

It should be noted that the detailed implementation solution of the detecting unit 501 being configured to trigger the generation of the probe light pulse may include: a pump laser, an EDFA, an optical switch, and a controller.

The pump laser is configured to generate pump light, and input the generated pump light into the EDFA. The EDFA is configured to, according to the inputted pump light, amplify and output the optical signal inputted into the EDFA.

The optical switch is configured to, according to the control of the controller, set up a connection between the EDFA and the location of the fault at the time T1 and cut off the connection between the EDFA and the location of the fault at the time T2, so as to generate a probe light pulse whose pulse width is T2−T1.

The controller is configured to, according to the received executing location detection command, control the optical switch to set up a connection between the EDFA in the RPT1 and the location of the fault at the time T1 and cut off the connection between the EDFA and the location of the fault at the time T2.

The pump laser, the EDFA, the optical switch, and the controller work together to realize the foregoing function of triggering the generation of the probe light pulse.

The detailed implementation solution of the detecting unit 501 being configured to trigger the generation of the probe light pulse may include a pump laser, an EDFA, and a controller (which will be described in detail in conjunction with FIG. 7 and FIG. 8 and embodiments shown in FIG. 7 and FIG. 8 subsequently).

The sending unit 502 is configured to send the time T1 and the time T3 to the SLTE, or send the time difference between the time T3 and the time T1 to the SLTE, where the SLTE obtains the location of the fault according to a formula $d=(c*t)/(2IOR)$, where d represents a distance between a location of generating the probe light pulse and the location of the fault, c represents a propagation speed of light in vacuum, $t=T3−T1$, and IOR refers to a refractive index of transmission media.

Figure 6:
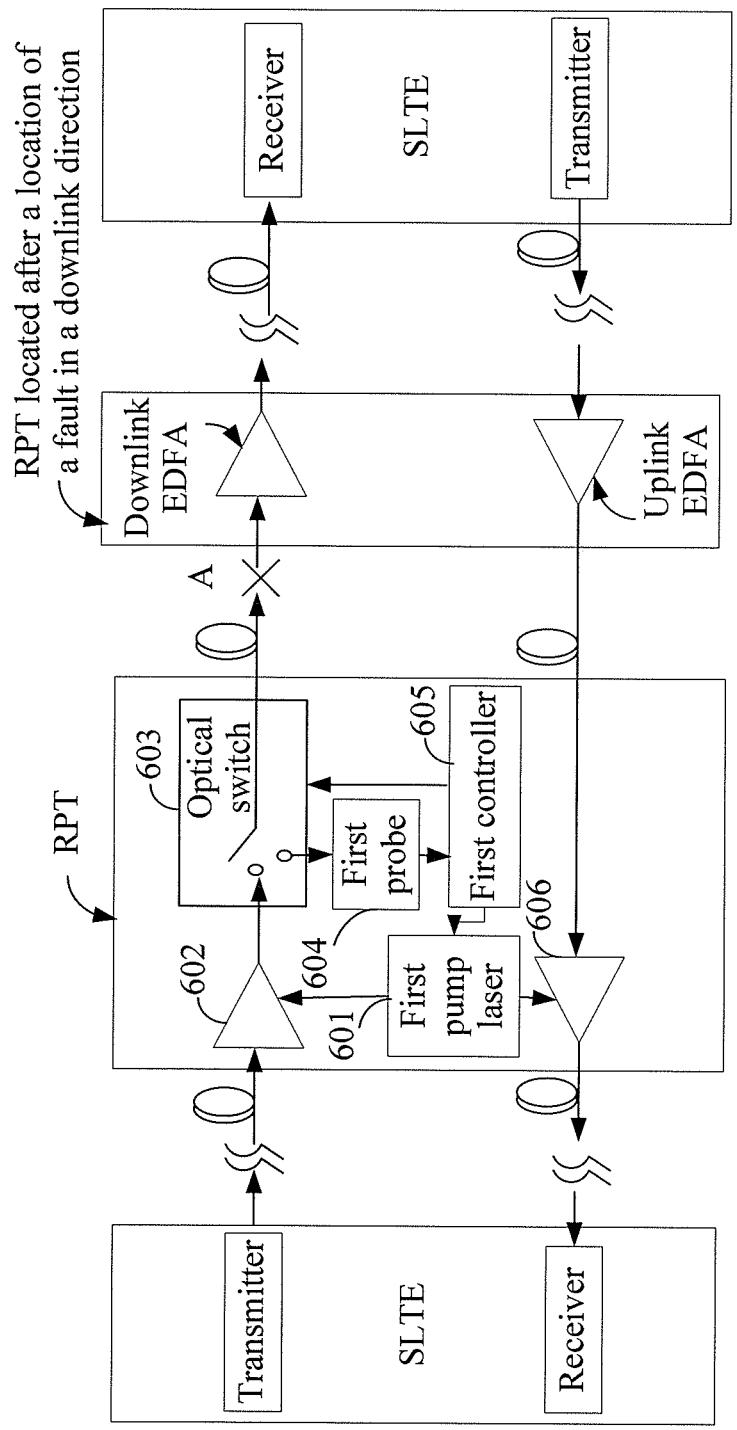
FIG. 6 is a schematic brief diagram of an RPT in a submarine cable system according to Embodiment 3 of the present invention.
Figure 7:
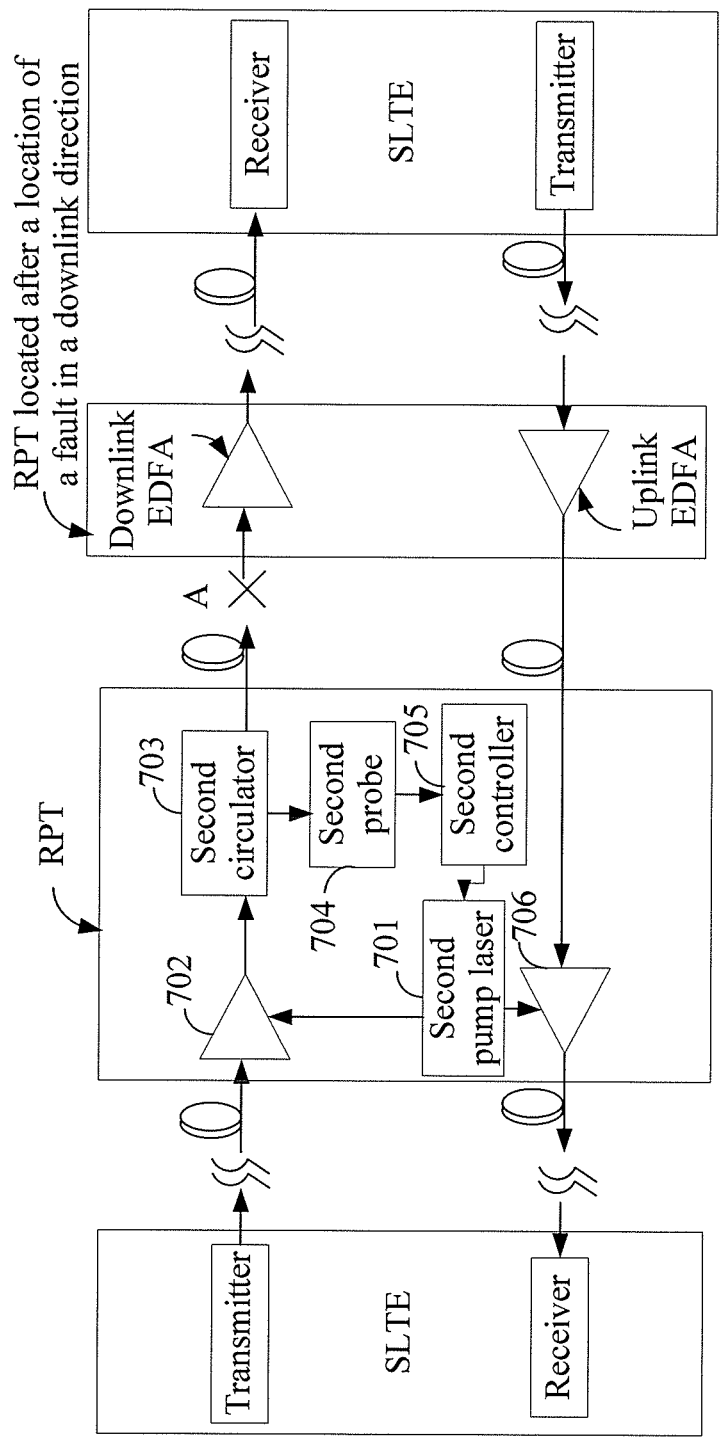
FIG. 7 is a schematic brief diagram of an RPT in a submarine cable system according to Embodiment 4 of the present invention.
Figure 8:
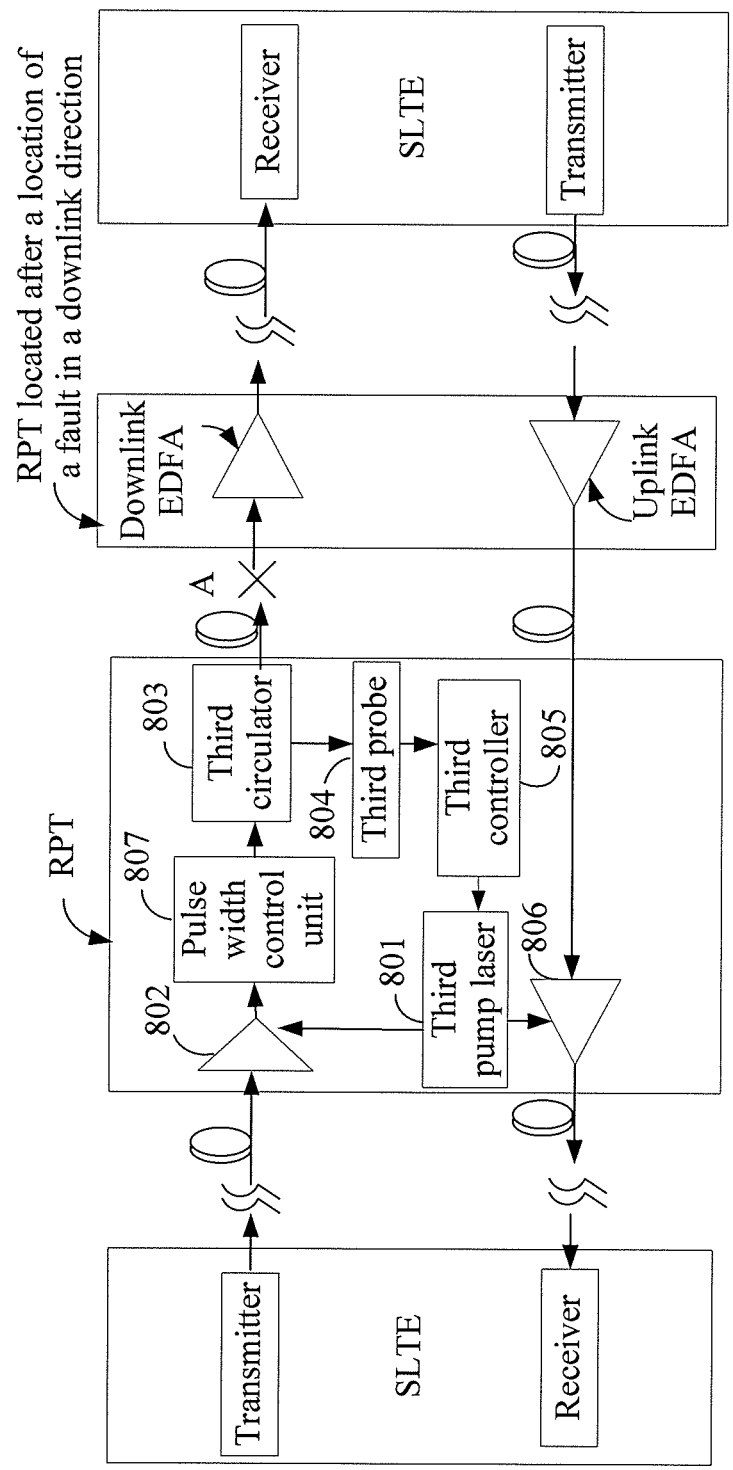
FIG. 8 is another schematic brief diagram of an RPT in a submarine cable system according to Embodiment 4 of the present invention.

The detailed solution of the sending unit 502 in the RPT may be implemented by an EDFA (for details, see a fourth EDFA in FIG. 6, FIG. 7, and FIG. 8).

In the RPT provided in the embodiment of the present invention, the RPT may emit a probe light pulse, obtain the time T1 of emitting the probe light pulse, obtain the time T3 of detecting the probe light pulse reflected from the location of the fault, and sends the obtained T1 and T3 to the SLTE, so as to locate the fault accurately according to principles of the OTDR. Compared with the prior art, the SLTE is enabled to locate the fault of the submarine cable more quickly and accurately, so that maintainers may maintain the submarine cable in time.

The logical units in an RPT provided in the embodiment of the present invention are described above. It is not easy to demonstrate the logical units to a third person in the form of visible entities. Therefore, the logical units are detailed below with reference to an RPT provided in Embodiment 3 and Embodiment 4.

Embodiment 3

An embodiment of the present invention provides an RPT. As shown in FIG. 6, a detecting unit 501 of the RPT includes a first pump laser 601, a first EDFA 602, an optical switch 603, a first probe 604, and a first controller 605. The sending unit 502 specifically includes a fourth EDFA 606.

The first pump laser 601 is configured to generate pump light according to control of the first controller 605, and enable the generated pump light to be incident into the first EDFA 602 and the fourth EDFA.

The first EDFA 602 is configured to use the pump light generated by the first pump laser 601 to amplify the optical signal which is sent by the SLTE and includes an executing location detection command, and input the amplified optical signal to the first controller 605; and use the pump light generated by the first pump laser 601 to output probe light.

The optical switch 603 is configured to according to the control of the first controller 605, set up a connection between the first EDFA 602 and the location of a fiber cut at time T1 to time T2, so that the first EDFA 602 outputs a probe light pulse whose pulse width is T2−T1; and set up a connection between the first probe 604 and the location of the fault (namely, point A) at time T2.

The first probe 604 is configured to set up a connection between the first probe 604 and the location of the fault at time T2, and detect the probe light pulse reflected from the location of the fault.

The first probe 604 detects the probe light pulse reflected from the location of the fault by converting the input light pulse into an electric pulse and then inputting the electric pulse into the first controller 605.

The first controller 605 is configured to obtain, according to the location detection command, time T3 of detecting the light pulse, and send a detection result to the first pump laser 601.

The first controller 605 in the RPT performs processing such as amplification, filter and analog-to-digital conversion on the obtained electric pulse, so as to obtain time T3. The speed of performing, by the first controller 605, processing such as amplification, filter and analog-to-digital conversion on the electric pulse obtained by the first probe 604 is so fast that the time spent may be ignored. Therefore, the time T3 is approximately regarded as the time when the first probe 604 detects the reflected light pulse.

The fourth EDFA is configured to send the detection result to the SLTE by using the pump light sent by the first pump laser 601.

The foregoing detection result may include start time T1 of outputting the light pulse from the first EDFA 602 and time T3 of detecting the reflected light pulse by the first probe 604, or may be the value of T3−T1. After receiving the detection result, the SLTE may locate the fault of the submarine cable quickly and accurately according to the principles of the OTDR.

In the RPT provided in the embodiment of the present invention described above, the RPT receives a location detection command, the first controller 605 controls the optical switch 603 to output a light pulse as a probe light pulse which is incident to the location of the fault; the controller obtains the time difference between the probe light pulse and the reflected light pulse, and sends the time difference to the terrestrial SLTE; and the SLTE may easily locate the fault according to the principles of the OTDR. Compared with the prior art, the RPT may obtain the parameters (T1 and T3 or the value of T3−T1) for locating faults of submarine cables more quickly and accurately, and a terrestrial device may locate the fault of the submarine cable according to the parameters, so that maintainers may maintain the submarine cable in time.

Embodiment 4

An embodiment of the present invention provides an RPT. As shown in FIG. 7, the detecting unit 501 of the RPT specifically includes a second pump laser 701, a second EDFA 702, a second circulator 703, a second probe 704, and a second controller 705. The sending unit 502 specifically includes a fourth EDFA 706.

The second pump laser 701 is configured to generate, according to control of the second controller 705, pump light as probe light pulse at time T1 to time T2, and enable the probe light pulse to be incident into the second EDFA 702; the pump light is generated according to the control of the second controller 705 and incident into the second EDFA 702.

The second EDFA 702 is the same as the first EDFA 602 described in Embodiment 3. For details, see Embodiment 3.

The functions of the second circulator are similar to those of the optical switch 703 described in the Embodiment 3. The second circulator 703 is configured to set up a connection between an output end of the second EDFA 702 and the location A of the fault, input the probe light pulse into the location of the fault, set up a connection between the second probe 704 and the location of the fault, and input the reflected probe light pulse into the second probe 704 after the probe light pulse is reflected from the location of the fault.

Therefore, the second probe 704 is configured to detect, according to the connection which is set up by the second circulator 703 and between the second probe 704 and the location of the fault, the probe light pulse reflected from the location of the fault.

The second controller 705 is configured to control, according to the location detection command, the second pump laser 701 to generate pump light as probe light pulse at time T1 to time T2; obtain time T3 of detecting the light pulse, and send a detection result to the fourth pump laser 706.

The fourth EDFA 706 is the same as the fourth EDFA 606 described in Embodiment 3, and is not repeatedly described here.

In the RPT provided in the embodiment of the present invention described above, the RPT obtains an executing location detection command, controls the on/off state of the second pump laser 701 through the second controller 705 to output a light pulse as a probe light pulse which is incident to the location of the fault; the second controller 705 obtains the time difference between the probe light pulse and the reflected light pulse, and sends the time difference to the terrestrial SLTE; and the SLTE may easily locate the fault according to the principles of the OTDR. Compared with the prior art, the RPT may obtain the parameters (T1 and T3, or value of T3−T1) for locating faults of submarine cables more quickly and accurately, and the terrestrial device may locate the fault of the submarine cable according to the parameters, so that the maintainers may maintain the submarine cable in time.

Optionally, the detecting unit 501 of the RPT provided in this embodiment may further include a pulse width control unit 807, as shown in FIG. 8. The pulse width control unit 807 and a third circulator 803 work together to implement the functions of the optical switch 603 provided in Embodiment 3. That is to say, the pulse width control unit 807 is configured to set up a connection between the third EDFA 802 and the location of the fault at time T1 to time T2, and the third pump laser 801 may be always on to input pump light into the third EDFA 802. The second circulator is the same as the third circulator.

After the pulse width control unit 807 is added, other units in the RPT include the third pump laser 801, the third EDFA 802, the third probe 804, the third controller 805, and the fourth EDFA 806, which are correspondingly the same as the first pump laser 601, the first EDFA 602, the first probe 604, the first controller 605, and the fourth EDFA 606 described in Embodiment 3, which are not repeatedly described here.

Through the pulse width control unit 807 added in this embodiment, the probe light pulse is generated without turning on or turning off the pump laser in the RPT, which reduces wear-down of the pump laser and prolongs the life of the pump laser. The pulse width control unit 807 may be implemented by a modulator or an attenuator, or another optical component with the same functions.

It should be noted that the first EDFA 602, the second EDFA 702, and the third EDFA 802 are the same; and the first pump laser 601, the second pump laser 701, and the third pump laser 801 are also the same. They are named differently for ease of distinguishing in FIG. 6, FIG. 7, and FIG. 8.

Embodiment 5

Figure 9:
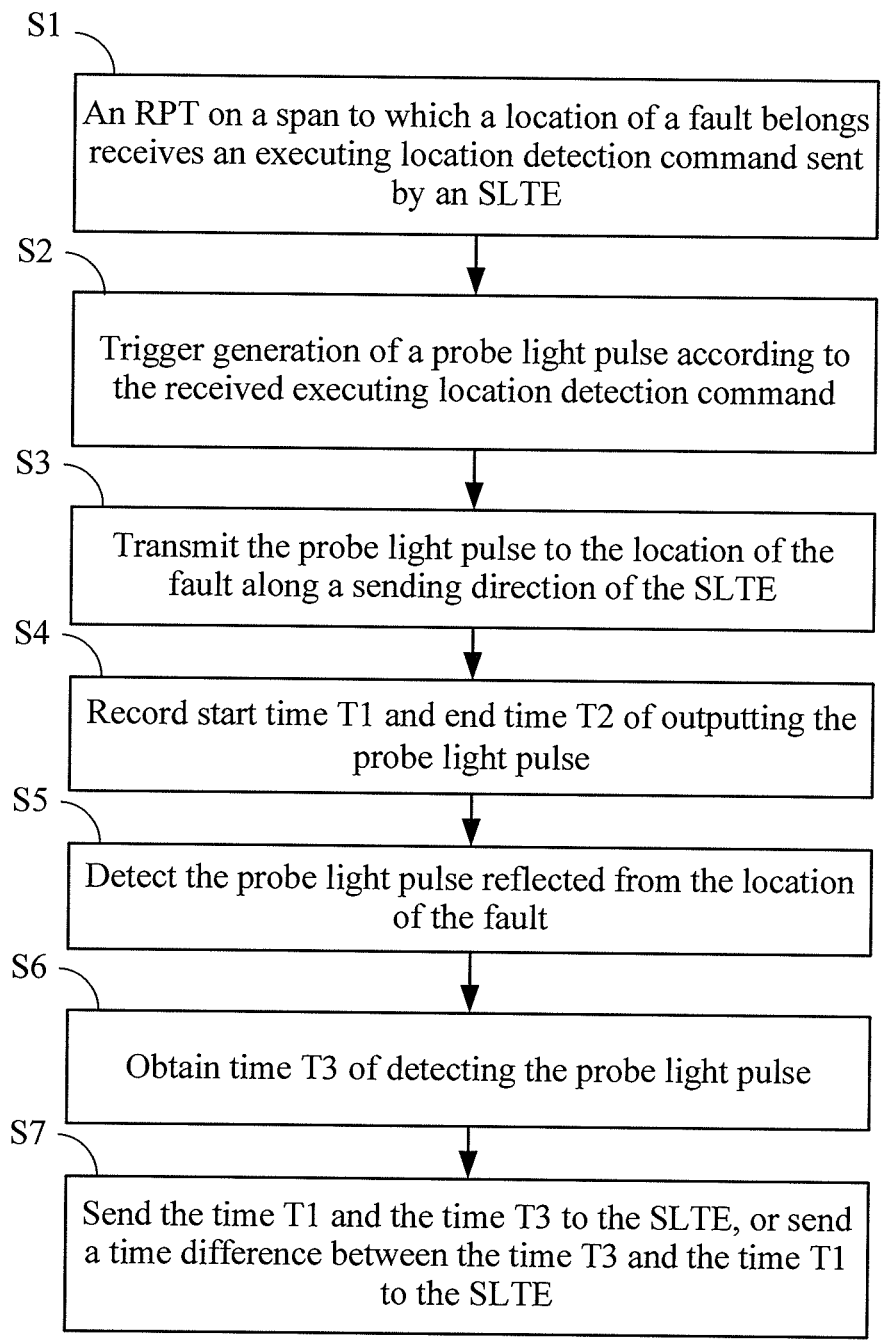
FIG. 9 is a schematic brief diagram of a method for locating a fault of a submarine cable according to Embodiment 5 of the present invention.

An embodiment of the present invention provides a method for locating a fault of a submarine cable. As shown in FIG. 9, the method includes:

Step S1: An RPT on a span to which a location of a fault belongs receives an executing location detection command sent by an SLTE.

It should be noted that because the RPT in this communication system is submarine and is not suitable for communicating with the SLTE directly, in order to query and control the state of the submarine devices, an intelligent submarine cable monitoring device (the intelligent submarine cable monitoring device may be integrated in the SLTE, or may be a stand-alone device independent of the SLTE; in this embodiment, the intelligent submarine cable monitoring device is integrated in the SLTE for ease of understanding) controls the SLTE to send a query command, and the query command is transmitted to each submarine device through an optical path or a feeder system. After receiving the query command, the submarine devices execute the corresponding query or control operations according to the query command corresponding to their respective address codes, and then send a response command that carries the result of the query or control to the SLTE 401 through the optical path or feeder system. The intelligent submarine cable monitoring device may locate the span in which the fault of the submarine device is located quickly by querying the input light power and the output light power of each RPT. However, the distance between spans is usually scores of kilometers or even over a hundred kilometers. The intelligent submarine cable monitoring device may know the span in which the fault is located, and know an identifier of the RPT which is the closest to the location of the fault on this span and may communicate with the SLTE. Therefore, the SLTE may notify the RPT, which is the closest to the location of the fault on this span and may communicate with the SLTE, to perform location detection.

The executing location detection command may include an identifier which is of the RPT on the span to which the location of the fault belongs and determined by the SLTE, so that the RPT compares its own identifier with the RPT identifier in the received executing location detection command to judge whether to perform the subsequent probe task. If the identifiers are the same, the RPT performs subsequent operations; if the identifiers are different, the RPT performs no subsequent operation.

Step S2: Trigger generation of a probe light pulse according to the received executing location detection command.

For ease of understanding, in step S2, it should be noted that the RPT may compare its own identifier with the identifier which is of the RPT on the span to which the location of the fault belongs, and determined by the SLTE and in the executing location detection command, and trigger the generation of the probe light pulse if the identifiers are the same.

Step S3: Transmit the probe light pulse to the location of the fault along a sending direction of the SLTE.

It should be noted that among two RPTs which are on the span to which the fault belongs and determined by the SLTE, the RPT being the closest to the SLTE is generally selected to perform the detection (namely, the fault is not between the SLTE and the RPT that performs the detection). However, the embodiment of the present invention is not limited to the foregoing description.

Step S4: Record start time T1 and end time T2 of outputting the probe light pulse.

The RPT may control the pulse width (namely, T2−T1) of the generated probe light pulse. The specific pulse width is decided according to the requirements of designers.

Step S5: Detect the probe light pulse reflected from the location of the fault, and obtain time T3 of detecting the probe light pulse.

Step S6: Send the time T1 and the time T3 to the SLTE, or send a time difference between the time T3 and the time T1 to the SLTE, where the SLTE obtains the location of the fault according to a formula d=(c*t)/(2IOR), where d represents a distance between a location of generating the probe light pulse and the location of the fault, c represents a propagation speed of light in vacuum, t=T3−T1, and IOR refers to a refractive index of transmission media.

The foregoing formula is the subject matter of the principles of the OTDR. It should also be noted that, t is the total time (a half of the product of c and t is a one-way distance, namely, t=T3−T1) from sending the signal to receiving the signal (round-trip time); IOR is the refractive rate of transmission media, and is generally provided by the fiber manufacturer. Because the propagation speed of light in glass is slower than that in vacuum, the transmission distance of the light may be calculated through this formula. It should also be noted that in the embodiment of the present invention, d represents a distance from the RPT that emits the probe light pulse to the location of the fault. Because the location of each RPT in the submarine cable system is known, the location of the fault is easily located after the distance d from the RPT that emits the probe light pulse to the location of the fault is obtained.

In the method for locating a fault of a submarine cable provided in the embodiment of the present invention, the RPT controls the internal component to output a light pulse as a probe light pulse which is incident to the location of the fault; the RPT obtains the time difference between the probe light pulse and the reflected light pulse, and sends the time difference to the terrestrial SLTE; and the SLTE may easily locate the fault according to the principles of the OTDR. Compared with the prior art, the method may locate the fault of the submarine cable more quickly and accurately, so that maintainers may maintain the submarine cable in time.

Embodiment 6

An embodiment of the present invention provides a method for locating a fault of a submarine cable. The method is similar to the method provided in the foregoing Embodiment 5, but differs in that the method for locating a fault of a submarine cable provided in this embodiment is preferable.

Figure 10:
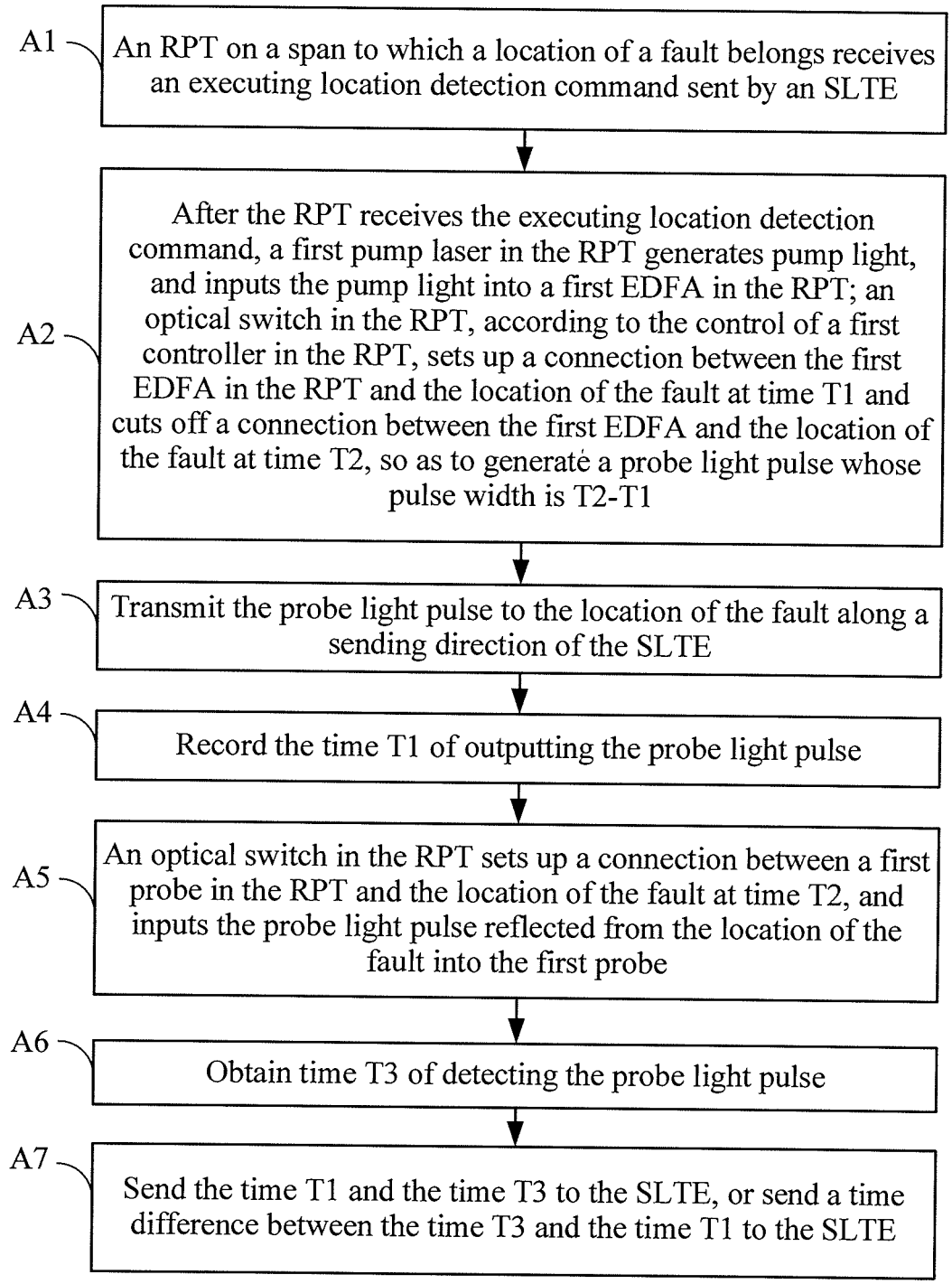
FIG. 10 is a schematic brief diagram of a method for locating a fault of a submarine cable according to Embodiment 6 of the present invention.

The embodiment of the present invention is described in detail with reference to an RPT module shown in FIG. 6 and a brief diagram of a method according to an embodiment of the present invention shown in FIG. 10, and the method includes the following steps:

Step A1: Same as step S1 in Embodiment 5, an RPT on a span to which a location of a fault belongs receives an executing location detection command sent by an SLTE.

The SLTE sends the executing location detection command to the RPT at the start location of the span. The start location refers to the RPT before the location of the fault in the direction of sending the optical signal. As shown in FIG. 6, if the fault is located between a first EDFA 602 in a downlink direction and a downlink EDFA namely, the location of the fault (fiber cut A); the first EDFA 602 and the fourth EDFA 606 are located in one RPT, and the downlink EDFA and an uplink EDFA are located in another RPT. The submarine cable monitoring device (the submarine cable monitoring device may be integrated in the SLTE or stand-alone) sends the executing location detection command to the RPT in which the first EDFA 602 is located, and the RPT performs subsequent operation of locating the fault. The executing location detection command may specifically include: an identifier which is of the RPT on the span to which the location of the fault belongs and determined by the SLTE, so that the RPT that receives the executing location detection command compares its own identifier with the RPT identifier in the received executing location detection command. If the identifiers are the same, the RPT performs subsequent operations; if the identifiers are different, the RPT performs no subsequent operation.

Step A2: After the RPT receives the executing location detection command, a first pump laser 601 in the RPT generates pump light, and inputs the pump light into a first EDFA 602 in the RPT; an optical switch 603 in the RPT, according to the control of the first controller 605, sets up a connection between the first EDFA 602 in the RPT and the location of the fault at time T1 and cut off the connection between the first EDFA and the location of the fault at time T2, so as to generate a probe light pulse whose pulse width is T2−T1.

Step A3: Transmit the probe light pulse to the location of the fault along a sending direction of the SLTE.

Step A4: Record the time T1 of outputting the probe light pulse.

Specifically, step A4 may be performed by the controller in the RPT. In step A2, in the sending direction of the SLTE, the light pulse with a pulse width being T2−T1 output from the first EDFA 602 in the RPT is the optical signal output by the submarine cable system normally. As shown in FIG. 6, in the sending direction of the SLTE, the fiber cut A is located after the RPT, and therefore in the RPT, normal optical signal and pump laser light are input into the first EDFA 602, and the first EDFA 602 outputs the amplified optical signal.

Step A5: The optical switch 603 in the RPT sets up a connection between the first probe 604 in the RPT and the location of the fault at time T2, and inputs the probe light pulse reflected from the location of the fault into the first probe 604.

Step A5 is performed because Fresnel reflection of light is rather strong at the location of the fault (such as fiber cut). The RPT inputs the optical signal reflected from the location of the fault into the first probe 604 in the RPT. As shown in FIG. 6, an optical switch is used in the RPT. The optical switch 603 sets up a connection between an output end of the first EDFA 602 and the fiber cut A at time T1, and cuts off the connection between the output end of the first EDFA 602 and the fiber cut A at time T2. Therefore, a light pulse whose pulse width is T2−T1 is transmitted to the fiber cut A; meanwhile, at time T2, the optical switch sets up a connection between the fiber cut A and the first probe 604 in the RPT, so that the light pulse whose pulse width is T2−T1 may be reflected from the fiber cut A into the first probe 604 through the Fresnel reflection.

Step A6: The first probe 604 in the RPT detects the probe light pulse reflected from the location of the fault, and the controller in the RPT obtains time T3 of detecting the light pulse.

In step A6, the first probe 604 in the RPT converts the input light pulse into an electric pulse; the first controller 605 in the RPT performs processing such as amplification, filter and analog-to-digital conversion on the obtained electric pulse, so as to obtain time T3. The speed of performing, by the controller, processing such as amplification, filter and analog-to-digital conversion on the electric pulse obtained by the first probe 604 is so fast that the time spent may be ignored. Therefore, T3 is approximately regarded as the time when the first probe 604 detects the reflected light pulse.

Step A7: The RTP sends a detection result to the SLTE, where the detection result is the start time T1 of outputting the light pulse by the first EDFA 602 and the time T3 of detecting the reflected light pulse by the first probe 604. Therefore, the SLTE obtains the location of the fault according to a formula d=(c*t)/(2IOR), where d represents a distance between the location of generating the probe light pulse and the location of the fault, c represents a propagation speed of light in vacuum, t=T3−T1, and IOR refers to a refractive index of transmission media.

As shown in FIG. 6, the RPT in step A7 may send T1 and T3 to the SLTE as the detection result in the following way: the first controller 605 in the RPT modulates the detection result onto the first pump laser 601, and the first pump laser 601 modulates the detection result onto the light output by the fourth EDFA 606 by modulating the gain of the fourth EDFA 606, and the detection result is finally transmitted to the SLTE. The detection result in step A7 may also be sent to the SLTE according to the prior art.

It should be noted that the detection result sent by the RPT to the SLTE in step A7 may also be the value of T3−T1. The RPT device is submarine, and its designed circuits should be as simple as practicable to improve reliability. Therefore, the operations in the RPT should be minimized. For example, the calculation of the accurate location of the submarine cable fault is not necessarily performed in the RPT according to the principles of the OTDR, and resources of the first controller 605 in the RPT may be saved; instead, the needed parameters (T3 and T1 or the value of T3−T1) are sent to the terrestrial SLTE, and the accurate location of the submarine cable fault is calculated.

In the method for locating a fault of a submarine cable provided in the embodiment of the present invention described above, the span in which the fault is located is found first, and the RPT in the span controls a first EDFA inside the RPT to output a light pulse, which is incident to the location of the fault as a probe light pulse; in this way, the RPT obtains the time difference between the probe light pulse and the reflected light pulse, and sends the time difference to the terrestrial SLTE. In this way, the SLTE may easily locate the fault according to the principles of the OTDR.

However, in the prior art, the probe light pulse needs to travel a round trip between the SLTE and the location of the fault. In the prior art, multiple EDFAs are set on the path between the SLTE and the location of the fault, and the finally returned probe light pulse accumulates much ASE noise, and the SLTE needs to perform multiple averaging operations to improve the signal-to-noise ratio of the received probe light pulse and finally locate the fault. Compared with the prior art, the method may locate the fault of the submarine cable more quickly and accurately, so that maintainers may maintain the submarine cable in time.

Embodiment 7

An embodiment of the present invention provides a method for locating a fault of a submarine cable. The method is similar to the method provided in the foregoing Embodiment 6, but differs in that: this embodiment primarily describes how the RPT controls the EDFA to output the light pulse whose pulse width is T2−T1.

Figure 11:
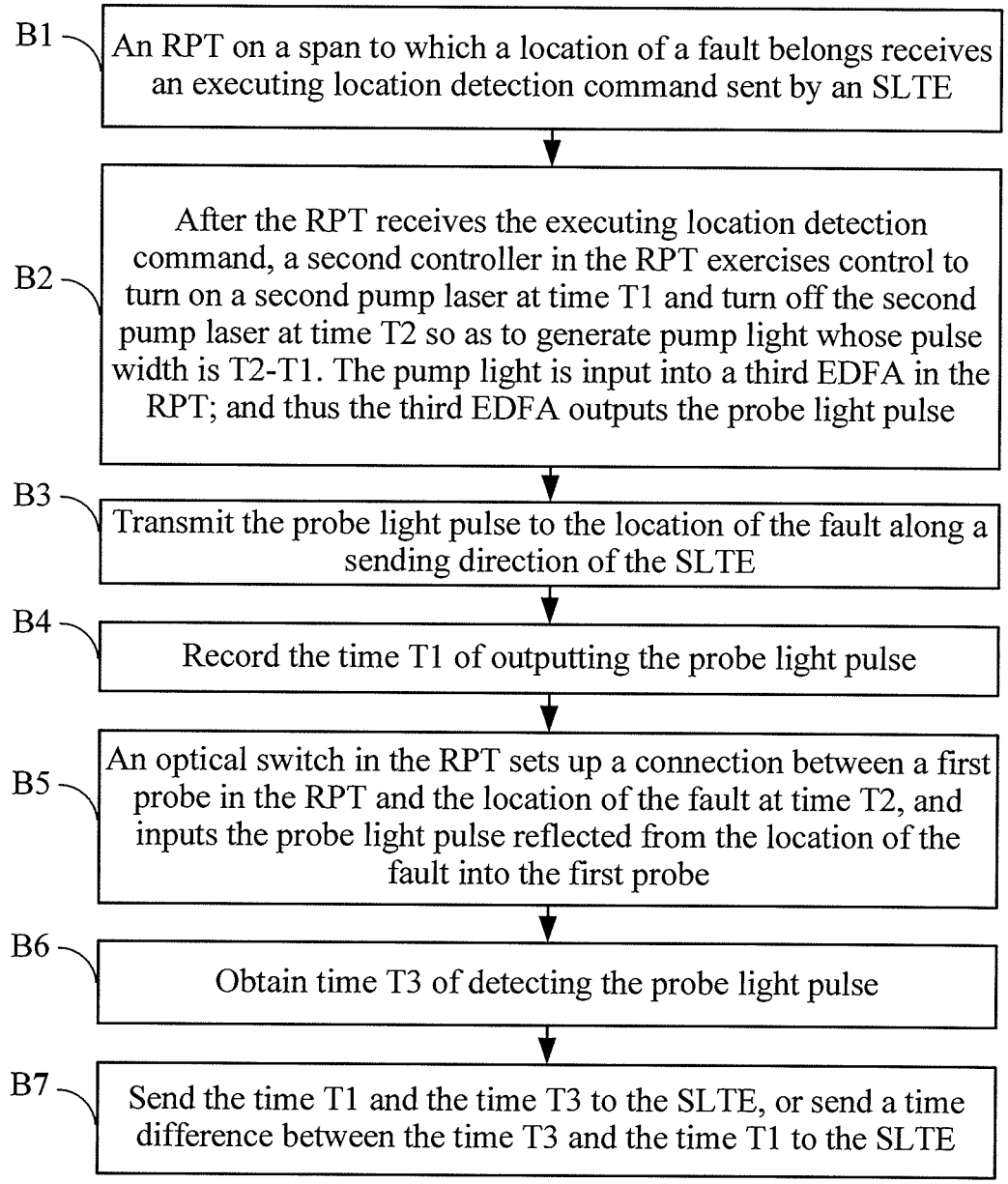
FIG. 11 is a schematic brief diagram of a method for locating a fault of a submarine cable according to Embodiment 7 of the present invention.

The embodiment of the present invention is described in detail with reference to an RPT module shown in FIG. 7 and a brief diagram of a method according to an embodiment of the present invention shown in FIG. 11, and the method includes the following steps:

Step B1: Same as step A1 in Embodiment 6, an RPT on a span to which a location of a fault belongs receives an executing location detection command sent by an SLTE. The executing location detection command at least carries information about an identifier which is of the RPT on the span to which the location of the fault belongs and determined by the SLTE.

Step B2: After the RPT receives the executing location detection command, a second controller 705 in the RPT exercises control to turn on a second pump laser 701 at time T1 and turn off the second pump laser 701 at time T2, so as to generate pump light whose pulse width is T2−T1. The pump light is input into a second EDFA 702 in the RPT; and the second EDFA 702 outputs the probe light pulse.

As shown in FIG. 7, the probe light pulse output by the second EDFA 702 in the RPT is obtained by controlling the on/off state of the second pump laser 701. A second circulator 703 is set at an output port of the second EDFA 702 to output the light pulses whose pulse width is T2−T1 to the location of the fault, and perform step B3 below.

It should be noted that before time T1, the second pump laser 701 is off, but some optical signals are still incident from the SLTE into the second EDFA 702, and are output from the second EDFA 702 to the fault location A. Because no pump light is incident in, the second EDFA 702 does not amplify the optical signal incident from the SLTE, and the erbium-doped fiber attenuates the optical signal drastically. Therefore, the optical signal attenuates massively along the distance from the second EDFA 702 and the fault location A, and the second probe 704 is unable to detect the optical signal. Therefore, if no pump light exists, it is deemed that no probe light pulse exists in the RPT.

Step B3: Same as step A3 in Embodiment 6, transmit the probe light pulse to the location of the fault along a sending direction of the SLTE.

Step B4: Same as step A4 in Embodiment 6, record the time T1 of outputting the probe light pulse.

Step B5: Set up a connection between the second probe 704 in the RPT and the location of the fault through the second circulator 703 in the RPT, and input the probe light pulse reflected from the location of the fault into the second probe 704.

In step B2 and step B3 described above with reference to FIG. 7, the second pump laser is turned on at the time T1 and turned off at the time T2 to generate probe light pulse whose pulse width is T2−T1; a second circulator is added after an output end of the second EDFA to reflect the probe light pulse from the location of the fault to the second probe. That is to say, the second circulator sets up a connection between the second probe in the RPT3 and the location of the fault.

It should also be noted that erbium ion has a lifetime on the previous energy level, the second EDFA outputs nothing at the instant of turning on the second pump laser. Therefore, a fixed delay exists, and the fixed response delay between the second pump laser and the output of the second EDFA needs to be taken into account at the time of locating the fault according to the time difference T3−T1 shown in FIG. 7. The delay t′ may be measured beforehand, and is subtracted from the result of T3−T1. The delay t′ is the time spent from the second pump laser sending pump light to the second EDFA outputting the probe light.

Step B6: The second probe 704 in the RPT detects the probe light pulse reflected from the location of the fault, and the controller in the RPT obtains time T3 of detecting the light pulse.

Step B7: The RTP sends a detection result to the SLTE, where the detection result is the start time T1 of outputting the light pulse by the second EDFA 702 and the time T3 of detecting the reflected light pulse by the second probe 704. Therefore, the SLTE obtains the location of the fault according to a formula d=(c*t)/(2IOR), where d represents a distance between the location of generating the probe light pulse and the location of the fault, c represents a propagation speed of light in vacuum, t=T3−T1, and IOR refers to a refractive index of transmission media.

In the method for locating a fault of a submarine cable provided in the embodiment of the present invention described above, the span in which the fault is located is found first, and the RPT in the span controls a second EDFA inside the RPT to output a light pulse, which is incident to the location of the fault as a probe light pulse; in this way, the RPT obtains the time difference between the probe light pulse and the reflected light pulse, and sends the time difference to the terrestrial SLTE. In this way, the SLTE may easily locate the fault according to the principles of the OTDR. Compared with the prior art, the method may locate the fault of the submarine cable more quickly and accurately, so that maintainers may maintain the submarine cable in time.

Optionally, in the method for locating a fault of a submarine cable provided in Embodiment 7 of the present invention, the on/off state of the second pump laser is controlled to generate probe light pulse, which, however, shortens the life of the second pump laser. Therefore, an embodiment of the present invention also provides an alternative solution. As shown in FIG. 8, a pulse width control unit 807 is added between an output end of the third EDFA 802 and the third circulator. Under control of the pulse width control unit 807, the probe light pulse whose pulse width is T2−T1 may be transmitted to the location of the fault from the third EDFA 802, and the probe light pulse may be reflected from the location of the fault to the third probe 804. That is to say, the third circulator 803 sets up a connection between the third probe 804 in the RPT4 and the location of the fault. It can easily be known by comparing FIG. 7 and FIG. 8 that, the solution provided in the embodiment shown in FIG. 8 adds a pulse width control unit 807 on basis of the solution shown in FIG. 7; under control of the third controller 805, the pulse width control unit 807 outputs the probe light pulse whose pulse width is T2−T1.

The pulse width control unit 807 may be implemented by a modulator or an attenuator. The pulse width control unit is similar to an optical switch. For example, the third control unit exercises control on the attenuator, so that the attenuator attenuates the fiber to a small extent in the duration from time T1 to time T2, and the probe light pulse may be transmitted to the location of the fault through the attenuator, but the attenuator attenuates the fiber to a great extent at other time, and no probe light may be transmitted to the location of the fault. The modulator may also implement functions same as those of the attenuator. Therefore, the alternative solution shown in FIG. 8, in which the probe light pulse is generated according to the executing location detection command includes:

After the RPT receives the executing location detection command, the third pump laser 801 generates pump light, and inputs the pump light into the third EDFA 802. The pulse width control unit 807, according to the control of the third controller 805, sets up a connection between the third EDFA 802 and the location of the fault at time T1 and cuts off the connection between the third EDFA 802 and the location of the fault at time T2, so as to generate a probe light pulse whose pulse width is T2−T1.

The detecting the probe light pulse reflected from the location of the fault includes:

A third circulator 803 in the RPT sets up a connection between the third probe 804 in the RPT and the location of the fault, and inputs the probe light pulse reflected from the location of the fault into the third probe 804. Therefore, the third probe 804 detects the probe light pulse reflected from the location of the fault.

In this embodiment, a third circulator 803 is added in the RPT; under control of the third controller 805 in the RPT, the pulse width control unit outputs probe light pulse whose pulse width is T2−T1, which replaces the probe light pulse generated by controlling the on/off state of the second pump laser, and the life of the pump laser is prolonged, the submarine device is more stable, and the communication quality of the submarine communication system is improved.

Embodiment 8

An embodiment of the present invention provides a method for locating a fault of a submarine cable. The method is similar to the method provided in Embodiment 5 to Embodiment 7, but differs in that: the method in this embodiment is based on and preferable to Embodiment 5 to Embodiment 7.

The method includes the following steps:

Step C1: Same as step A1 in Embodiment 6, an RPT on a span to which a location of the fault belongs receives an executing location detection command sent by an SLTE. The executing location detection command at least includes information about an identifier which is of the RPT on the span to which the location of the fault belongs and determined by the SLTE.

Step C2: According to the received executing location detection command, the RPT (the RPT here may be any one of the RPTs shown in FIG. 6, FIG. 7, and FIG. 8), by using a pump laser in the RPT, outputs light pulse whose pulse width is T2−T1 from an EDFA (the EDFA may be anyone of the first EDFA shown in FIG. 6, the second EDFA in FIG. 7, and the third EDFA in FIG. 8) in the RPT to the location of the fault in a sending direction of the SLTE, where the pump laser uses its maximum optical power to output the light pulse.

The pump laser uses the maximum optical power to output the light pulse to the first EDFA, so that the signal of the probe light pulse output from the EDFA is strong, and the reflected probe light pulse may be easily detected by the probe (the probe here may be any one of the foregoing first probe, second probe, and third probe), and the error of the obtained time T3 is minimized.

Step C3: Same as step S3 in Embodiment 5, transmit the probe light pulse to the location of the fault along the sending direction of the SLTE.

Step C4: The detecting, by the probe in the RPT, light pulse reflected from the location of the fault specifically includes: obtaining amplitude of the optical signal detected from time (T1+Y) to time (T1+Z), where Y and Z are not variables.

Step C5: The RPT repeats step C2 to step C4 to generate probe light pulses for N times, transmits the probe light pulses to the location of the fault along the sending direction of the SLTE, records the start time Tn1 and the end time Tn2 of outputting the probe light pulses, where (Tn2−Tn1) is a constant greater than 0; and detects the amplitude of the optical signals from time (Tn1+Y) to time (Tn1+Z), where X and Y are constants.

Tn1 is the start time of outputting the probe light pulse numbered n, Tn2 is the end time of outputting the probe light pulse numbered n, (Tn1+Z)>(Tn1+Y), (Tn1+Y)>Tn2, and [(Tn1+Z)−(Tn1+Y)]>=(Tn2−Tn1).

N optical signal amplitudes detected from time (Tn1+Y) to time (Tn1+Z) are averaged in order to improve the signal-to-noise ratio, and the time Tn3 of detecting the probe light pulse numbered n is obtained.

Repeating step C2 to step C4 in step C5 refers to: generating the probe light pulses of the same pulse width for N times; recording the time Tn1 of outputting the probe light pulse numbered N; obtaining the pulse amplitude and noise amplitude of the reflected probe light pulse, and averaging out the N pulse amplitudes to obtain the pulse amplitude of a single reflected probe light pulse; averaging out the N noise amplitudes to improve the signal-to-noise ratio; obtaining the time $T_{3N}$ of detecting the probe light pulse numbered N, and sending Tn1 and Tn3 to the SLTE.

Step C6: The RPT uses Tn1 and Tn3 as a detection result, encodes the detection result, and sends the encoded detection result to the SLTE. Therefore, the SLTE obtains the location of the fault according to principles of the OTDR.

In step C6, the detection result may be encoded through Amplitude-Shift Keying (ASK) or Frequency Shift Keying (FSK), and the encoded detection result is modulated onto the pump laser, and then transmitted to the SLTE. The detection result may also be a value of Tn3−Tn1.

In method for location a fault of a submarine cable provided in the embodiment of the present invention described above, the span in which the fault is located is found first, and the RPT in the span controls an EDFA inside the RPT to output a light pulse, which is incident to the location of the fault as a probe light pulse; in this way, the RPT obtains the time difference between the probe light pulse and the reflected light pulse, and sends the time difference to the terrestrial SLTE. In this way, the SLTE may easily locate the fault according to the principles of the OTDR. Compared with the prior art, the method may locate the fault of the submarine cable more quickly and accurately, so that the maintainers may maintain the submarine cable in time.

Persons of ordinary skill in the art should understand that all or part of the steps of the method in the foregoing embodiments of the present invention may be implemented by a program instructing relevant hardware. The program may be stored in a computer readable storage medium. The storage medium may be a Read-Only Memory (ROM), a Random Access Memory (RAM), a magnetic disk, or a Compact Disk-Read Only Memory (CD-ROM).

Described above are a method for locating a fault of a submarine cable, an RPT, and a communication system provided in the embodiments of the present invention. Although the principles and implementations of the present invention are described through some exemplary embodiments, the preceding embodiments are merely used to help the understanding of the methods and ideas of the present invention. Meanwhile, those of ordinary skill in the art may make modifications and variations to the detailed embodiments and application scope without departing from the spirit and scope of the present invention. In conclusion, the contents of the specification shall not be construed as limitations to the present invention.

What is claimed is:

1. A method for locating a fault of a submarine cable, the method comprising:

receiving, by a Repeater (RPT), on a span to which a location of the fault belongs, an executing location detection command sent by a Submarine Line Terminal Equipment (SLTE);

triggering generation of a probe light pulse according to the received executing location detection command;

transmitting the probe light pulse to the location of the fault along a sending direction of the SLTE;

recording start time T1 and end time T2 of outputting the probe light pulse;

detecting the probe light pulse reflected from the location of the fault, and obtaining time T3 of detecting the probe light pulse; and sending the time T1 and the time T3 to the SLTE, or sending a time difference between the time T3 and the time T1 to the SLTE, wherein the SLTE obtains the location of the fault according to a formula $d=(c*t)/(2IOR)$, wherein d represents a distance between a location of generating the probe light pulse and the location of the fault, c represents a propagation speed of light in vacuum, $t=T3-T1$, and Index Of Refraction (IOR) refers to a refractive index of transmission media; wherein triggering generation of the probe light pulse according to the received executing location detection command comprises:

generating, by a pump laser in the RPT, pump light according to the received executing location detection command, and inputting the pump light into a Erbium-Doped Optical Fiber Amplifier (EDFA) in the RPT; setting up, by an optical switch in the RPT and according to control of a controller in the RPT, a connection between the EDFA and the location of the fault at the time T1, and cutting off the connection between the EDFA and the location of the fault at the time T2, so as to generate a probe light pulse whose pulse width is T2−T1; and wherein detecting the probe light pulse reflected from the location of the fault and obtaining the time T3 of detecting the probe light pulse comprises:

setting up, by the optical switch in the RPT, a connection between a probe in the RPT and the location of the fault at the time T2, and inputting the probe light pulse reflected from the location of the fault into the probe; and detecting, by the probe, the probe light pulse reflected from the location of the fault, and obtaining the time T3 of detecting the probe light pulse.

2. A method for locating a fault of a submarine cable, the method comprising:

receiving, by a Repeater (RPT), on a span to which a location of the fault belongs, an executing location detection command sent by a Submarine Line Terminal Equipment (SLTE);

triggering generation of a probe light pulse according to the received executing location detection command;

transmitting the probe light pulse to the location of the fault along a sending direction of the SLTE;

recording start time T1 and end time T2 of outputting the probe light pulse;

detecting the probe light pulse reflected from the location of the fault, and obtaining time T3 of detecting the probe light pulse; and sending the time T1 and the time T3 to the SLTE, or sending a time difference between the time T3 and the time T1 to the SLTE, wherein the SLTE obtains the location of the fault according to a formula $d=(c*t)/(2IOR)$, wherein d represents a distance between a location of generating the probe light pulse and the location of the fault, c represents a propagation speed of light in vacuum, t=T3−T1, and Index Of Refraction (IOR) refers to a refractive index of transmission media; wherein triggering the generation of a probe light pulse according to the received executing location detection command comprises:

exercising, by a controller in the RPT and according to the received executing location detection command, control to turn on a pump laser in the RPT at the time T1 and turn off the pump laser at the time T2, so as to generate pump light whose pulse width is T2−T1; and inputting the pump light into an Erbium-Doped Optical Fiber Amplifier (EDFA) in the RPT, wherein the EDFA outputs the probe light pulse; and wherein detecting the probe light pulse reflected from the location of the fault and obtaining the time T3 of detecting the probe light pulse comprises:

setting up, by a circulator in the RPT, a connection between a probe in the RPT and the location of the fault, and inputting the probe light pulse reflected from the location of the fault into the probe, wherein the probe detects the probe light pulse reflected from the location of the fault and obtains the time T3 of detecting the probe light pulse.

3. The method according to claim 2, wherein after sending the time difference between the time T3 and the time T1 to the SLTE, the method further comprises:

sending a delay t' to the SLTE, wherein the delay f is a duration between the pump laser sending the pump light and the EDFA outputting the pump light.

4. A method for locating a fault of a submarine cable, the method comprising:

receiving, by a Repeater (RPT), on a span to which a location of the fault belongs, an executing location detection command sent by a Submarine Line Terminal Equipment (SLTE);

triggering generation of a probe light pulse according to the received executing location detection command;

transmitting the probe light pulse to the location of the fault along a sending direction of the SLTE;

recording start time T1 and end time T2 of outputting the probe light pulse;

detecting the probe light pulse reflected from the location of the fault, and obtaining time T3 of detecting the probe light pulse; and sending the time T1 and the time T3 to the SLTE, or sending a time difference between the time T3 and the time T1 to the SLTE, wherein the SLTE obtains the location of the fault according to a formula $d=(c*t)/(2IOR)$, wherein d represents a distance between a location of generating the probe light pulse and the location of the fault, c represents a propagation speed of light in vacuum, t=T3−T1, and Index Of Refraction (IOR) refers to a refractive index of transmission media; wherein triggering the generation of a probe light pulse according to the received executing location detection command comprises:

generating, by a pump laser in the RPT, pump light according to the received executing location detection command, and inputting the pump light into an Erbium-Doped Optical Fiber Amplifier (EDFA) in the RPT; setting up, by a pulse width control unit in the RPT and according to control of a controller in the RPT, a connection between the EDFA and the location of the fault at the time T1, and cutting off the connection between the EDFA and the location of the fault at the time T2, so as to generate a probe light pulse whose pulse width is T2−T1; and wherein detecting the probe light pulse reflected from the location of the fault and obtaining the time T3 of detecting the probe light pulse comprises:

setting up, by a circulator in the RPT, a connection between a probe in the RPT and the location of the fault, and inputting the probe light pulse reflected from the location of the fault into the probe, wherein the probe detects the probe light pulse reflected from the location of the fault and obtains the time T3 of detecting the probe light pulse.

* * * * *